United States Patent [19]

Spencer

[11] Patent Number: 4,754,324

[45] Date of Patent: Jun. 28, 1988

[54] MULTI-COLOR IMAGE DISPLAY APPARATUS

[75] Inventor: Gordon R. Spencer, Westwood, Mass.

[73] Assignee: Raytheon Company, Lexington, Mass.

[21] Appl. No.: 39,816

[22] Filed: Apr. 14, 1987

Related U.S. Application Data

[63] Continuation of Ser. No. 771,162, Aug. 30, 1985, abandoned, which is a continuation of Ser. No. 350,469, Feb. 19, 1982, abandoned.

[51] Int. Cl.[4] .......................... H04N 5/74; H04N 9/22
[52] U.S. Cl. ........................................... 358/60; 358/71
[58] Field of Search ........................ 358/60, 64, 65, 67, 358/71, 81

[56] References Cited

U.S. PATENT DOCUMENTS

| | | | |
|---|---|---|---|
| 2,083,203 | 6/1937 | Schlesinger | 358/60 |
| 2,200,285 | 5/1940 | Lorenzen | 358/66 |
| 2,265,657 | 12/1941 | Von Ardenne | 358/60 |
| 2,337,980 | 12/1943 | DuMont et al. | 178/5.4 |
| 2,552,464 | 5/1951 | Siezen | 358/66 |
| 2,586,558 | 2/1952 | Oakhill | 178/5.2 |
| 2,677,722 | 5/1954 | Bedford | 178/5.4 |
| 2,965,706 | 12/1960 | Ridgeway | 178/5.4 |
| 3,006,989 | 10/1961 | Schroter | 178/5.4 |
| 3,202,039 | 8/1965 | De Lang et al. | 88/1 |
| 3,291,906 | 12/1966 | Ward et al. | 178/7.85 |
| 3,668,304 | 6/1972 | Eilenberger | 178/5.4 ST |
| 3,711,826 | 1/1973 | LaRussa | 340/27 |
| 3,778,548 | 12/1973 | Nistri | 178/7.88 |
| 3,885,095 | 5/1975 | Wolfson et al. | 178/7.88 |
| 4,167,113 | 9/1979 | Mann | 73/178 |
| 4,301,467 | 11/1981 | Jaeger | 358/41 |
| 4,301,468 | 11/1981 | Alvarez | 358/66 |

FOREIGN PATENT DOCUMENTS

| | | |
|---|---|---|
| 551357 | 4/1923 | France . |
| 762225 | 4/1934 | France . |
| 967439 | 11/1950 | France . |
| 160744 | 12/1981 | Japan . |
| 424743 | 5/1934 | United Kingdom . |
| 562168 | 7/1942 | United Kingdom . |
| 696615 | 9/1951 | United Kingdom . |
| 2029667 | 9/1979 | United Kingdom . |
| 2111712 | 10/1982 | United Kingdom . |

Primary Examiner—Tommy P. Chin
Attorney, Agent, or Firm—John T. Meaney; Richard M. Sharkansky

[57] ABSTRACT

Multi-color image display apparatus including a cathode ray tube having an electron gun disposed for directing an axially emerging electron beam onto an output phosphor screen comprised of two portions, each of which is disposed symmetrically with respect to the emerging electron beam and is provided with a respective different color phosphor material. The apparatus also includes a deflection system coupled to the emerging electron beam for deflecting it sequentially in respective inverted raster patterns over the two portions of the phosphor screen to produce respective different color mirror images of the same subject matter. Also, the apparatus includes an optical system coupled to the phosphor screen for superimposing the two color mirror images to produce a single multi-color image.

12 Claims, 4 Drawing Sheets

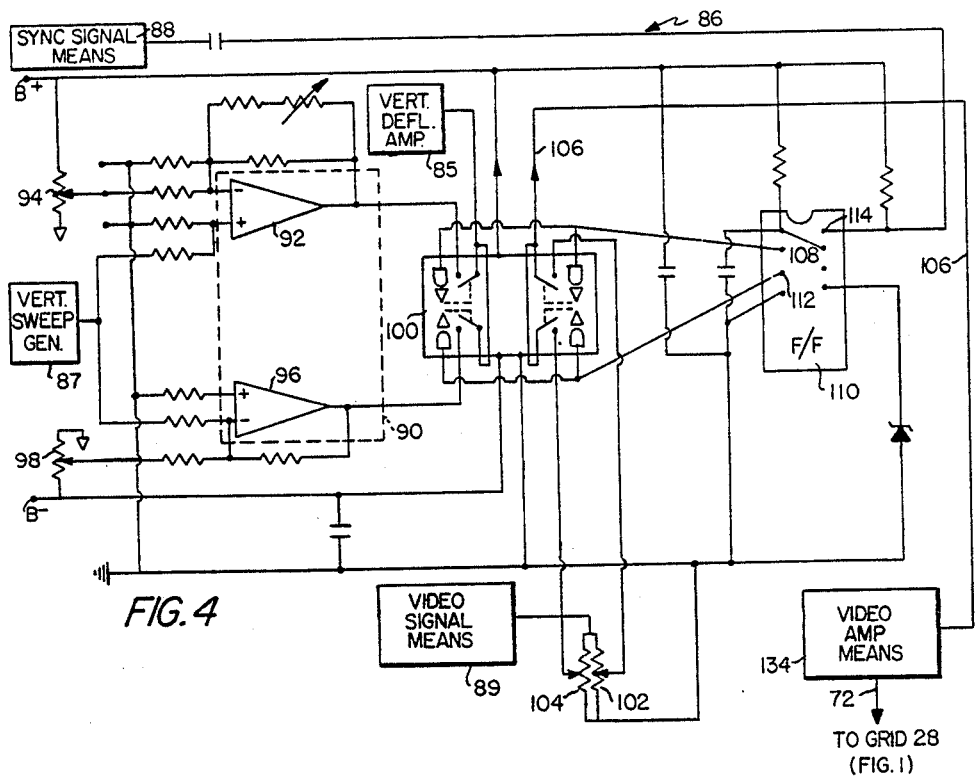
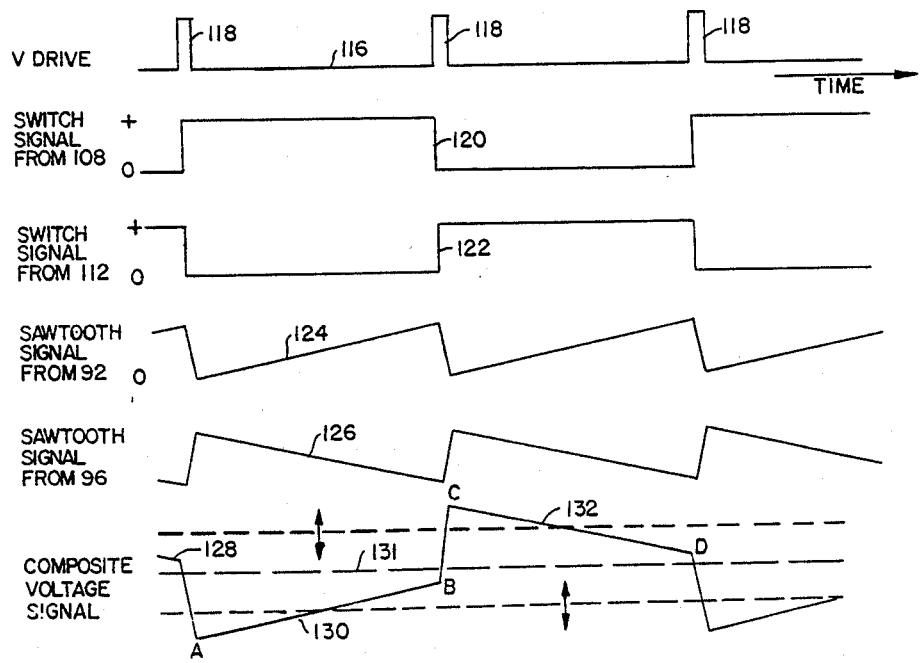

MULTI-COLOR IMAGE DISPLAY APPARATUS

This application is a continuation of application Ser. No. 771,162 filed Aug. 30, 1985, which is a continuation of application Ser. No. 350,469 filed Feb. 19, 1982 both now abandoned.

BACKGROUND OF THE INVENTION

1. Field of the Invention

This invention relates generally to multi-color image display apparatus and is concerned more particularly with apparatus including a cathode ray tube provided with means for producing two color mirror images of the same subject matter.

2. Discussion of the Prior Art

A cathode ray tube generally includes a tubular envelope having therein an electron gun disposed for directing an electron beam in scanning fashion over a portion of an output phosphor screen to produce a visible light image. The phosphor screen may be provided with a suitable phosphor material for emitting a desired color light when penetrated by electrons from the scanning beam. Thus, a plurality of cathode ray tubes may have respective phosphor screens comprised of different phosphor materials for producing respective different color images of the same subject matter, and be disposed for projecting the different color images into superposition with one another on a projection screen. As a result, there will be displayed on the projection screen a single multi-color image having discrete areas colored in accordance with the relative intensities of the different colors in corresponding discrete areas of the respective images produced by each of the cathode ray tubes.

However, it has been found difficult to provide a plurality of cathode ray tubes with means for producing identical images of the same subject matter, and to maintain the tubes in precise optical alignment so as to obtain color registration in discrete areas of the multi-color image. Consequently, there has been developed in the prior art various types of cathode ray tubes having phosphor screens provided with different phosphor materials for producing a multi-color image. A cathode ray tube of the shadow mask type, for example, has a phosphor screen provided with intermingled arrays of phosphor dots, the dots of each array comprising a different phosphor material for emitting a respective color light when penetrated by electrons from an associated beam passing through aligned apertures in a shadow mask. A cathode ray tube of the beam-indexing type, for another example, has a phosphor screen provided with intermingled arrays of phosphor stripes, the stripes of each array comprising a different phosphor material for localized emission of a respective color light when penetrated by electrons from a suitably indexed electron beam. A cathode ray tube of the voltage penetration type, for a third example, has a phosphor screen provided with superimposed layers of different phosphor material, the material of each layer being activated for localized emission of a respective color light when penetrated by electrons of an associated energy level in a scanning electron beam.

Thus, cathode ray tubes of the described types have phosphor screens requiring complex deposition techniques or special phosphor materials during fabrication, which increases the cost of producing these prior art tubes.

SUMMARY OF THE INVENTION

Accordingly, these and other disadvantages of the prior art are overcome by this invention providing multi-color image display apparatus with a cathode ray type tube having an output phosphor screen comprising two symmetrical coplanar portions made of different phosphor materials. These two portions of the phosphor screen are symmetrically disposed with respect to an electron beam emerging axially from a single electron gun within the envelope of the tube.

The apparatus also includes a deflection system coupled to the emerging electron beam and including mirror image raster generating means for causing the beam to scan the two portions of the phosphor screen sequentially in respective inverted raster patterns. As a result, the two portions of the phosphor screen produce respective color light images of the same subject matter which, due to the persistence of the phosphor materials together with the persistence of human vision, appear simultaneously on the screen. The two color images are mirror images which are symmetrical with respect to one another and to the axis of the electron beam emerging from the electron gun.

The apparatus also includes an optical system coupled to the phosphor screen for superimposing the two mirror images in different color lights to display a single multicolor image in a common plane.

BRIEF DESCRIPTION OF THE DRAWINGS

For a more complete understanding of the invention, reference is made in the following detailed description to the accompanying drawings wherein:

FIG. 4 is a schematic view of the inverter scanning circuit of the beam deflection means shown in FIG. 1;

FIG. 5 is a diagrammatic view of electrical signal waveforms generated in the use of the circuit shown in FIG. 4;

DESCRIPTION OF THE PREFERRED EMBODIMENTS

Figure 1:
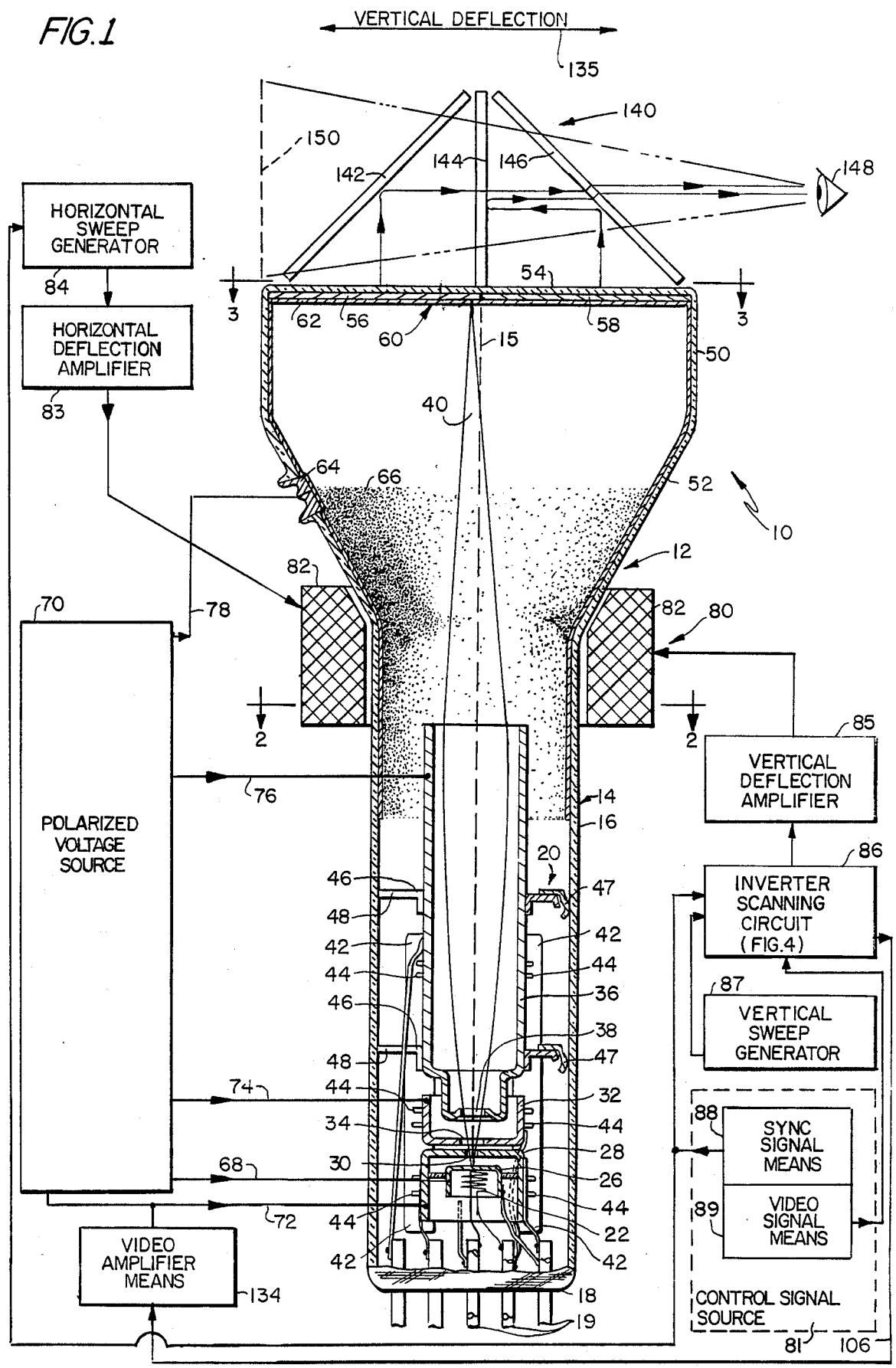
FIG. 1 is an axial sectional and schematic view of multi-color image display apparatus embodying the invention.

Referring to the drawings wherein like characters of reference designate like parts, there is shown in FIG. 1 a multi-color image display apparatus 10 comprising a cathode ray type of tube 12 provided with a funnel-shaped envelope 14 having an axial centerline 15 and made of suitable dielectric material, such as glass, for example. Envelope 14 includes a neck-end portion 16 terminating in a peripherally sealed stem press 18 through which a circular array of spaced terminal pins 19 extends hermetically. The terminal pins 19 provide means for making electrical connections to respective elements of an electron gun 20 disposed axially within the neck-end portion 16 of envelope 14.

Electron gun 20 includes a filamentary heater 22 having end portions connected electrically through respective terminal pins 19 to an external filament supply (not shown) which supplies electrical current for heating the heater 22. The heater 22 is axially disposed within an inverted cathode cup 26 which has a closed end provided with an outer coating (not shown) of electron emissive material. Cathode cup 26 is axially disposed in spaced relationship within an inverted first grid cup 28 which has an aperture 30 centrally disposed in its closed end and aligned with the adjacent closed end of cathode cup 26. The closed end of inverted first grid cup 28 is disposed in close spaced juxtaposed relationship with a closed end of an upright second grid cup 32. Centrally disposed in closed end of second grid cup 32 is an aperture 34 which has a larger diameter than the aligned aperture 30 centrally disposed in the adjacent closed end of first grid cup 28. The opposing open end of second grid cup 32 has insulatingly extended within it a reduced diameter closed end of an elongated focussing cup 36. Focussing cup 36 has centrally disposed in its closed end an aperture 38 which has a diameter larger than aperture 34 and is axially aligned with the respective apertures 34 and 30. Thus, the electron gun 20 is disposed for producing and directing an electron beam 40 axially out of the opposing open end of focussing cup 36 which constitutes the exit end portion of gun 20.

Figure 2:
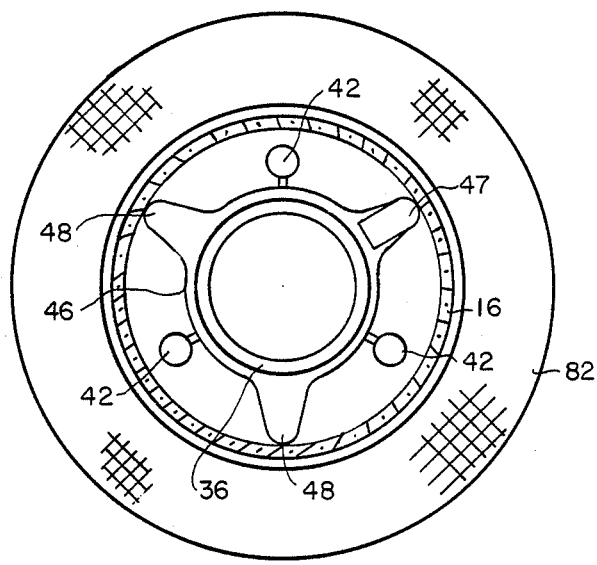
FIG. 2 is a cross-sectional view of the tube shown in FIG. 1 and taken along the line 2—2 looking in the direction of the arrows.

The beam-forming electrodes 28, 32, and 36 of gun 20 are insulatingly attached to one another by means of axially extending dielectric rods 42 which, as shown in FIG. 2, are angularly spaced apart about the gun. Each of the beam-forming electrodes 28, 32 and 36, are fixedly attached, as by welding, for example, to bight end portions of respective metallic brackets 44 which have leg end portions attached to one of the rods 42. Thus, the respective beam-forming electrodes form a sub-assembly which is supported on the stem press 18 by having the first grid cup 28 attached electrically to three angularly spaced terminal pins 19. The focussing electrode 36 is encircled by axially spaced rings 46 which have inner collar portions attached, as by welding, for example, to annular portions of the electrode 36.

As shown in FIG. 2, each of the rings 46 has a resilient projection 47 and two angularly disposed rigid projections 48 which extend from the axial centerline of focussing electrode 36 a radial distance substantially equal to the radius of the neckend portion 16. Consequently, the resilient projection 47 pressing against the adjacent wall of envelope 14 urges the rigid projections 48 into firm contact with the inner surface of neck-end portion 16 thereby positioning the central apertures 30, 34 and 38 of the beamforming electrodes 28, 32 and 36, respectively, substantially on the axial centerline 15 of the envelope.

The neck-end portion 14 is integrally joined to an opposing larger diameter end portion 50 of envelope 12 through an interposed outwardly flared portion 52 thereof. Larger diameter end portion 50 terminates in a peripherally sealed faceplate 54 which is made of transparent material, such as glass, for example. Deposited by conventional means on the inner surface of faceplate 54 is an output phosphor screen 60 comprising respective half portions, 56 and 58, respectively. The half portion 56 is made of a phosphor material, such as europium activated yttrium oxide, for example, which emits red light locally when penetrated by electrons from the beam 40. The half portion 58 is made of a different phosphor material, such as manganese activated zinc silicate, for example, which emits green light locally when penetrated by electrons from the beam 40. Thus, the respective half portions 56 and 58 of phosphor screen 60 are disposed in the same plane and have respective adjoining edge portions disposed substantially on an axial centerline 15 of envelope 12.

Disposed on the inner surface of phosphor screen 60 is an anode coating 62 of electrically conductive material, such as aluminum, for example, which reflects visible light. The coating 62 extends not only over the entire inner surface of larger diameter end portion 50 but also extends axially as well as annularly into the flared portion 52 of the envelope 12. Anode coating 62 is electrically connected to an anode terminal button 64 extending hermetically through the wall of flared portion 52 for the purpose of making an electrical connection to the anode electrode of tube 12. The anode terminal button 64 and the anode coating 62 are electrically connected to another anode coating 66 which extends from the button 64 toward the neck-end portion 14 of envelope 12. Coating 66 is made of suitable electrically conductive material, such as carbon, for example, which extends axially and annularly along the sloped inner surface of flared portion 52 and into the neck-end portion 16. Within neck-end portion 16, the anode coating 66 terminates in spaced encircling relationship with the exit end portion of gun 20 from which emerges the axially directed electron beam 40. Thus the respective anode coatings 66 and 62 form a generally inverted cup-shaped anode electrode which has established therein a substantially field-free space.

In operation, as shown schematically in FIG. 1, the cathode 26 of gun 20 may be electrically connected through a conductor 68 to a cathode voltage terminal of a polarized voltage source 70. The first grid electrode 28 of gun 20 may be connected electrically through a conductor 72 to a voltage terminal of source 70 which is electrically negative with respect to the cathode voltage terminal for the purpose of controlling the flow of electrons in the beam 40. The second grid electrode 32 of gun 20 may be connected electrically through a respective conductor 74 to an associated voltage terminal of source 70 which is more positive relative to the cathode voltage terminal; and the focussing electrode 36 of gun 20 may be connected electrically through a respective conductor 76 to an associated voltage terminal of source 70 which is still more positive with respect to the cathode voltage terminal of source 70. The anode terminal button 64 may be connected electrically through a conductor 78 to an anode voltage terminal of source 70 which is highly positive electrically with respect to the cathode voltage terminal of source 70. Thus, the respective beam forming electrodes 28, 32, 36 of gun 20 and the cup-shaped anode electrode of tube 12 are maintained at suitable electrical potentials relative to the potential of cathode 26 to focus the electrons of beam 40 onto a small spot area of phosphor screen 60 for producing a localized emission of visible light from the penetrated phosphor material.

A beam deflection system 80 has encircling the outer surface of neck-end portion 16, adjacent the flared portion 52 of envelope 14, an electromagnetic deflection yoke 82 through which the electron beam 40 exiting from gun 20 passes. The yoke 82 comprises an opposing pair of interconnected horizontal deflection coils (not shown) which are electrically connected through a conventional horizontal deflection amplifier 83 to a conventional horizontal sweep generator 84. The yoke 82 also includes an opposing pair of interconnected vertical deflection coils which are electrically connected through a conventional vertical deflection amplifier 85 to an inverter scanning circuit 86. Inverter scanning circuit 86 receives sweep signals from a conventional vertical sweep generator 87 and drive signals from a conventional sync signal means 88. The sync signal means 88 comprises a component of a control signal source 81 which also sends the drive signals to horizontal sweep generator 84. The inverter scanning circuit 86 also receives signals from a conventional video signal means 89 comprising another component of source 81, and feeds output signals through a conventional video amplifier means 134 to the first grid electrode 28 of tube 12.

As shown in FIG. 4, the inverter scanning circuit 86 includes a dual operational amplifier device 90 of the commercial type, such as Op Amp MC 1747 sold by Motorola Semiconductor Products of Pheonix, Ariz., for example. The device 90 includes an operational amplifier 92 having a positive input terminal connected electrically to the output terminal of vertical sweep generator 87 and a negative input terminal connected electrically to the wiper arm of a DC offset potentiometer 94. Device 90 also includes an operational amplifier 96 having a negative input terminal connected electrically to the output terminal of the vertical sweep generator 87 and connected electrically to the wiper arm of a DC offset potentiometer 98.

The output terminals of operational amplifiers 92 and 96 are connected electrically to respective input terminals on one-half of an integrated circuit switching device 100, such as Dual-In-Line Package DG 201 BP, Quad SPST, CMOS Analog Switch, sold by Siliconix of Santa Clara, Calif., for example, which has an output terminal connected electrically to the vertical deflection amplifier 85. The other half of switching device 100 has respective input terminals connected electrically to the wiper arms of video gain potentiometers, 102 and 104, respectively, and has an output terminal connected electrically through a conductor 106. The conductor 106 is connected electrically through the video amplifier means 134 and conductor 72 to the first grid electrode 28 (FIG. 1). Each half of switching device 100 has respective actuating terminals connected to an output terminal 108 of a flip-flop (F/F) device 110, and has respective actuating terminals connected to an output terminal 112 of device 110. The device 110 may be of a commercially available type such as Model SN 7473 Dual J-K With Clear made by Motorola Semiconductor Division of Phoenix Ariz., for example. The device 110 has a clocking or sync input terminal 114 connected electrically to the sync signal means 88.

Accordingly, the sync signal means 88 applies to the input terminal 114 of flip-flop device 110 a drive signal voltage which, as shown in FIG. 5, may be represented by the waveform 116 having regularly spaced pulses 118. Upon receipt of a pulse 118, the device 110 changes from one to the other of two operating states thereby changing the output voltages applied to its respective output terminals 108 and 112 correspondingly. Thus, as shown by the associated square waveforms, 120 and 122, respectively, a pulse 118 at the input terminal 114 may cause the device 110 to apply a positive voltage pulse to its output terminal 108, for a predetermined interval of time, while a zero voltage pulse is applied to the output terminal 112. Upon receipt of the next drive pulse 118 at its input terminal 114, the device 110 changes its mode of operation to apply a positive voltage pulse to its output terminal 112, for an equal predetermined interval of time, while a zero voltage pulse is applied to its output terminal 108.

As a result, the switching device 100 is actuated for the predetermined interval to connect the output terminal of operational amplifier 92 to the vertical deflection amplifier 85 such that it receives a voltage signal represented by the positive going sawtooth waveform 124. Then, the switching device 100 is actuated for the equal predetermined interval of time to connect the output terminal of operational amplifier 96 to the vertical deflection amplifier 85 whereby it receives a voltage signal represented by the negative going sawtooth waveform 126. Consequently, the vertical deflection amplifier 85 receives a composite voltage signal represented by the waveform 128 having a positive going sawtooth pulse 130 which commences at maximum value A below the center value 131 corresponding to the adjoining edges of screen portions 56 and 58 and terminates at a value B offset from the center value 131 by the setting of potentiometer 94. The waveform 128 then has an alternate negative going sawtooth pulse 132 which commences at a maximum value C above center value 131 and terminates at a value D offset from center value 131 by the setting of potentiometer 98.

The deflection amplifier 85 is of the conventional type for converting the received voltage signal 128 to equivalent electrical current which flows through the yoke 82 to establish a corresponding magnetic field for deflecting the electron beam 40. Accordingly, the electron beam 40 (FIG. 1) is deflected in line-by-line fashion to scan a raster area of phosphor screen portion 56 from adjacent the periphery of faceplate 54 toward the centerline 15 of tube 12 in the direction shown by double-ended arrow 135. Then, the electron beam is deflected vertically in the direction of arrow 135 to a point adjacent the opposing periphery of faceplate 54 and is deflected laterally in line-by-line fashion to scan a symmetrically inverted raster area of phosphor screen portion 58 from the periphery of faceplate 54 toward the centerline of tube 12. Thus, the inverter scanning circuit 86, together with horizontal and vertical sweep generators, 84 and 87, respectively, comprises a mirror raster generating means for causing the beam 40 to scan respective symmetrically inverted raster areas on the viewing screen portions 56 and 58, respectively.

As shown in FIG. 1, the video signal means 89 functions through the inverter scanning circuit 86 and the video amplifier means 134 to vary the potential of first grid electrode 28 instantaneously with respect to the potential of cathode 26 and thereby produce corresponding instantaneous variations in the electron current of beam 40 as it scans each of the mirror raster areas on screen portions 56 and 58, respectively.

Referring again to FIG. 4, it may be seen that when the switching device 100 is actuated to connect the output of operational amplifier 92 to vertical deflection amplifier 85, it also connects the wiper arm of potentiometer 102 through output conductor 106, video amplifier means 134, and conductor 72 to the first grid electrode 28 of tube 12. Similarly, when the switching device 100 is actuated to connect the output of operational amplifier 96 to deflection amplifier 85, it also connects the wiper arm of potentiometer 104 to the first grid electrode 28 of tube 12. Consequently, when the beam 40 is scanning respective inverted raster areas on the two half portions 56 and 58 of phosphor screen 60, the video signal from video signal means 89 applied to first grid electrode 28 can be adjusted to give the desired intensity of light emitted from the respective phosphor materials comprising the viewing screen portions 56 and 58.

Figure 3:
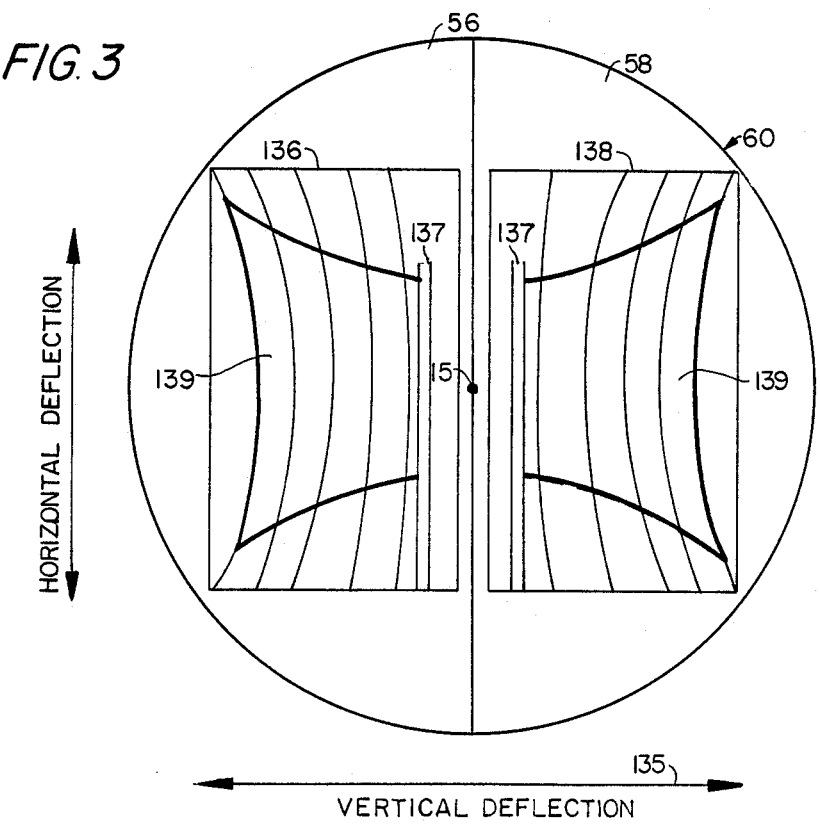
FIG. 3 is an elevational view of the output phosphor screen of the tube shown in FIG. 1.

Accordingly, as shown in FIG. 3, there is produced on the screen portions 56 and 58 different color mirror images 136 and 138, respectively, of the same subject matter, such as a flag 139 extended outwardly from a flag pole 137, for example. The image 136 is produced by localized emission of red light from the phosphor material of screen portion 56; and the image 138 is produced by the localized emission of green light from the different phosphor material of screen portion 58. However, it is important to note that pin-cushion distortions in the two images, 136 and 138, respectively, have been exaggerated to show the mirror symmetry even of these distortions. Thus, due to the physical symmetry achieved in the described operation of tube 12, even imperfections which occur in the image 136 when the beam 40 is scanning the red portion 56 of screen 60 on one side of the centerline of tube 12 are symmetrically repeated in the image 138 when the beam 40 is scanning the green portion 58 of screen 60 on the other side of the centerline of tube 12. Accordingly, if the respective mirror images 136 and 138 are folded congruently onto one another along their adjoining edges on centerline 15, not only will the respective straight flag poles 137 adjacent centerline 15 be in registration with one another but also the curved edge portions of the respective symmetrically disposed flags 139 will be in registration with one another without requiring any compensation or correction for the distortions.

Referring again to FIG. 1, there is shown optically coupled to the phosphor screen 60 an optical system 140 which is positioned in precise fixed relationship to the plane of the screen portions 56 and 58. The system 140 includes a dichroic mirror 144, which is transmissive to red light and reflective to green light, is disposed coplanar with the axial centerline of tube 12 and the adjoining edges of screen portions 56 and 58, respectively. A second, mirror 142, which is reflective to the red light emitted by screen portion 56, is disposed at about a forty-five degree angle with respect to the plane of screen portion 56 and to the plane of dichroic mirror 144. A beamsplitter 146, which is transmissive to red light and partly reflective, partly transmissive to green light, is disposed at about a forty-five degree angle with respect to the plane of screen portion 58 and to the plane of dichroic mirror 144.

In operation, red light from the image 136 produced by screen portion 56 is reflected from mirror 142 and passes through the mirror 144 to beamsplitter 146, where a substantial portion of the red light continues through the beamsplitter 146 to the eye 148. On the other hand, green light from image 138 produced by screen portion 58 is partially reflected from the beamsplitter 146 to the dichroic mirror 144 where it also is reflected back to beamsplitter 146. A substantial portion of the green light continues through beamsplitter 146 to the eye 148. Because the images 136 and 138 are symmetrical mirror images and because the arrangement of optical components is designed to provide equal optical path lengths for the red and green rays from corresponding discrete areas of these images to the eye, and because the red and green light rays from corresponding discrete areas arrive at the eye 148 from identical directions, these corresponding discrete areas are seen by the eye 148 to be in registration with one another. The virtual image plane 150 represents the surface at which the images 136 and 138 appear to the eye 148 to be located and superimposed with one another. The optical distance from virtual image plane 150 to the eye 148 is identical to the optical distance from images 136 and 138 to the eye 148, and may be imagined to have been created by unfolding the paths of the light rays at the reflecting surfaces. The color in each of the discrete areas of the multi-color image is determined by the relative intensities of red and green lights in corresponding discrete areas of the images 136 and 138, respectively. The red intensity in image 136 and the green intensity in image 138 may be controlled by the amplitudes of the video signals applied between the grid 28 and the cathode 26 during the time intervals when the beam 40 is scanning the red portion 56 and the green portion 58, respectively of the phosphor screen 60.

Figure 6:
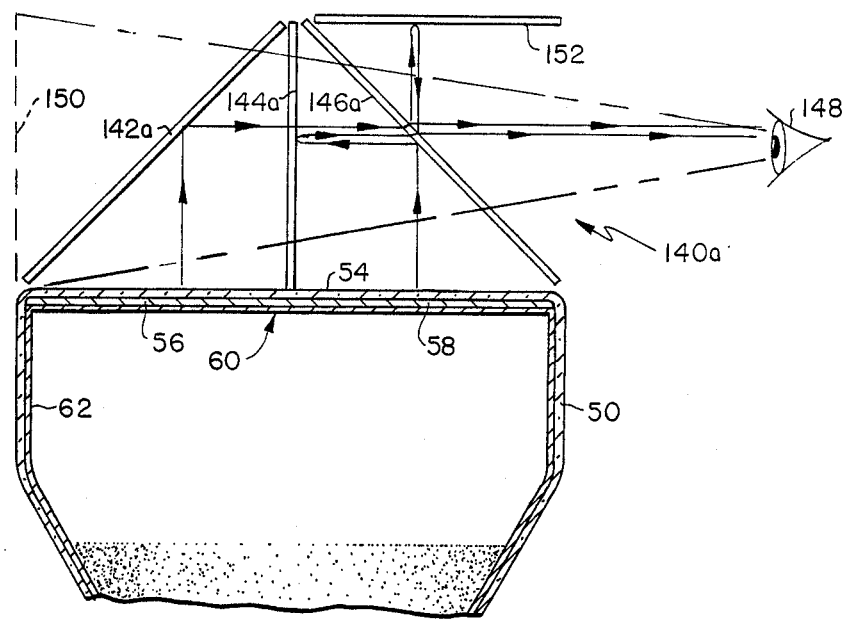
FIG. 6 is an alternative embodiment of the optical system shown in FIG. 1 coupled to the viewing screen shown in FIG. 3.

As shown in FIG. 6, an alternative embodiment 140a of the optical system 140 may comprise respective optical elements 142a, 144a and 146a, which are similar to the respective optical elements 142, 144 and 146 of system 140, and an additional mirror 152. The mirror 152 is highly reflective to the green light produced by the screen portion 58 and is disposed on the far side of beamsplitter 146a, parallel to screen portion 58, and at an optical distance from screen portion 58 equal to the optical distance from screen portion 58 to the dichroic mirror 144a. Consequently, the component of each light ray produced by screen portion 58 which passes directly through the beamsplitter 146a is reflected from mirror 152 back to the beamsplitter 146a where a portion of said component is reflected by beamsplitter 146a to the eye 148 along the same optical path as that of the component reflected by mirror 152. Because the optical paths of these different green light ray components are identical as they arrive at eye 148 and are equal in total length from each light emitting point to the eye, each such light-emitting point will be seen by eye 148 as a single image point. It is apparent that the purpose of mirror 152 is to recover a substantial portion of the green light that would otherwise be lost from the system through beamsplitter 146. As in the embodiment shown in FIG. 1, corresponding discrete areas of images 136 and 138 are seen by the eye 148 to be superimposed in the virtual image plane 150.

These and other modifications will readily occur to those skilled in the art. For example, the composite waveform 128 produced by inverter scanning circuit 86 may be altered to cause the beam 40 to scan the raster area 136 shown in FIG. 3 from adjacent the centerline 15 outwardly toward the periphery of faceplate 54, and then have the returning beam cross over the centerline 15 to scan the raster area 138 from adjacent the centerline 15 outwardly toward the opposing peripheral portion of faceplate 54. Also, the mirrors 142, 144 and 146 shown in FIG. 1 may be replaced by suitably coated surfaces of right-angle prisms positioned over the screen portion 56 and 58, respectively, of the viewing screen 60. Alternatively, the mirrors 142, 144 and 146 may be held in alignment with one another and with the phosphor screen 60 by filling the spaces between the faceplate 54 and the mirrors with optically clear, index-matching resin, such as used for bonding implosion panels to faceplates of display tubes, for example. Moreover, it may be found desireable to interpose a suitable optical element, such as a circular polarizer, for example, between the screen portion 58 and the beamsplitters 146 or 146a for improving contrast by preventing green light emanating from a point on screen 58 from being reflected back in excessive amounts to illuminate the remainder of screen portion 58. Also, the faceplate 54 may be made of fiber optic or other suitable material having light transmittance characteristics different from those of glass. Further, the deflection yoke, when oriented as desired, may be hard mounted to the exterior surface of tube 12 in a conventional manner for fabricating ruggedized cathode ray tubes. In addition, a magnifying lens, contrast enhancement filter, and/or other types of optical devices may be disposed between the optical system 140 and the eye 148 for enlarging the final multi-color image, improving the contrast of the image, and/or producing a projected real image. Moreover, the two portions 56 and 58 may be addressed randomly, as in computer display terminals, for example, rather than by scanning as described.

From the foregoing, it will be apparent that all of the objectives of this invention have been achieved by the structures shown and described herein. It also will be apparent, however, that various changes may be made by those skilled in the art without departing from the spirit of the invention as expressed in the appended claims. It is to be understood, therefore, that all matter shown and described herein is to be interpreted in an illustrative rather than in a limiting sense.

What is claimed is:

1. Image display apparatus comprising:
   imaging means including an image producing tube having a longitudinal centerline and an output screen disposed transversely of said centerline in an output portion of the tube, the output screen having two portions disposed symmetrically with respect to said centerline and made of respective different phosphor materials responsive to beamed electrons, and a single electron gun operatively disposed relative to the output screen for producing thereon two mutually inverted component images of the same subject matter in respective different colors; and
   optical means externally mounted on said output portion of the tube in optically coupled relationship with said output screen and having an optical axis extended transversely of said longitudinal centerline of the tube, the optical means including means for optically rotating one of said mutually inverted images to the orientation of the other of said images and for displaying the resulting two similarly oriented images as a single composite image of the same subject matter in a plane viewable transversely of said longitudinal centerline of the tube.

2. The image display apparatus as set forth in claim 1 wherein said output screen is disposed substantially orthogonal to said longitudinal centerline of the tube and said optical axis is extended in spaced, substantially parallel relationship with said output screen.

3. The image display apparatus as set forth in claim 1 wherein said output screen has a central portion disposed between said two portions of the output screen and said electron gun is disposed in spaced alignment with said central portion of the output screen for producing an emergent electron beam directed toward said central portion for the output screen.

4. The image display apparatus as set forth in claim 3 wherein said imaging means includes beam deflection means coupled to said electron beam for scanning said beam over respective inverted raster pattern areas of said two portions of the output screen and producing said two mutually inverted component images.

5. The image dispaly apparatus as set forth in claim 4 wherein said beam deflection means includes adjustment means for adjusting the positions of said respective inverted raster pattern areas relative to said central portion of the output screen.

6. Image display apparatus comprising:
   a tubular envelope having an output end portion and having a longitudinal centerline;
   a planar output screen disposed transversely of said centerline within said output end portion of the envelope and having two portions symmetrically disposed with respect to said centerline, each of said portion being made of respective different phosphor materials responsive to beamed electrons;
   electron beaming means including a single electron gun disposed within the envelope in longitudinal spaced relationship with said output screen for directing a longitudinally emergent electron beam onto corresponding discrete areas of said two portions and for producing thereon respective mutually inverted image disposed symmetrically with respect to said centerline; and
   optical means externally mounted on said output end portion of the envelope in optically coupled relationship with said output screen and having an optical axis extended in spaced, substantially parallel relationship with said planar output screen, the optical means including means of or optically rotating said mutually inverted images in respective reverse directions to respective similar orientations and displaying the resulting two similarly oriented images as a single composite image in a plane viewable in a direction extended substantially parallel to said output screen.

7. Image display apparatus as set forth in claim 6 wherein said two portions are made of respective different phosphor materials and said mutually inverted images are produced in respective different colors.

8. Image display apparatus as set forth in claim 6 wherein said electron beaming means includes beam deflection means for scanning said beam sequentially in respective inverted raster fashion over said two portions of the screen.

9. Image display apparatus as set forth in claim 8 wherein said electron beaming means includes variable signal means for instantaneously varying the electron current in said scanning beam and producing said mutually inverted images on said two portions of the screen.

10. A cathode ray type of image producing apparatus comprising:
    a tubular envelope having a transparent output faceplate;
    means within said envelope including a planar output screen having two symmetrical portions of respective phosphor materials disposed in adjacent aligned relationship with respective portions of said output faceplate and a single electron gun disposed in operative spaced relationship with said output screen for producing on said two symmetrical portions of the output screen respective mutually inverted images of the same subject matter and for transmitting through said output faceplate said mutually inverted images of the same subject matter; and
    optical means externally mounted on said output faceplate and having respective portions aligned with said two symmetrical portions of said output screen for receiving said mutually inverted images transmitted though said output faceplate, one of said respective portions of the optical means including means for inverting the received image to an orientation similar to the orientation of the other image, and said optical means including means for combining the resulting similarly oriented images and producing a single composite image of said subject matter in a plane substantially orthogonal to said planar output screen.

11. A cathode ray type of image producing apparatus as set forth in claim 10 wherein said single electron gun is disposed in axially aligned relationship with a central portion of said output screen for electrically scanning said two symmetrical portions of the output screen in respective reverse raster fashion.

12. A cathode ray type of image producing apparatus as set forth in claim 11 wherein said two symmetrical portions of the output screen are made of respective different phosphor materials for producing thereon said mutually inverted images in respective different colors.

* * * * *